Aug. 9, 1960 P. BECKMAN 2,948,872
SENSING MEANS
Filed May 18, 1959
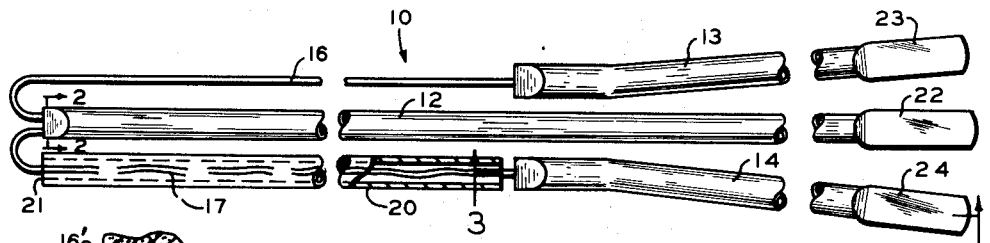
FIG. 1
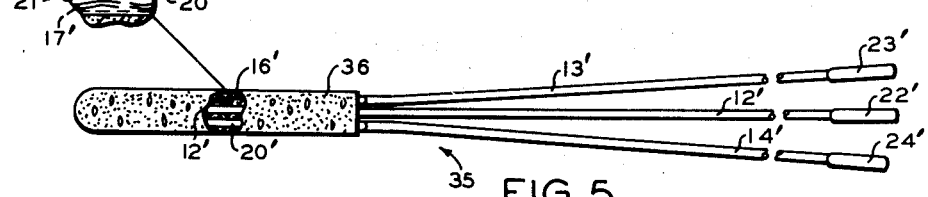
FIG. 5
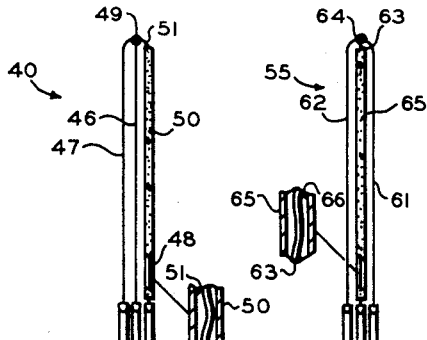
FIG. 6  FIG. 7
FIG. 2
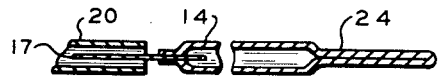
FIG. 3
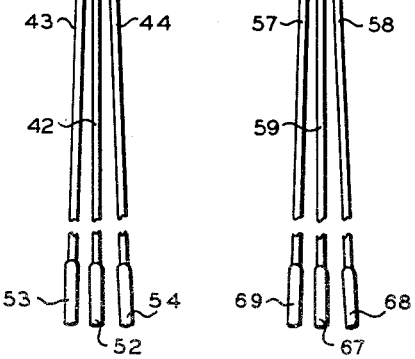
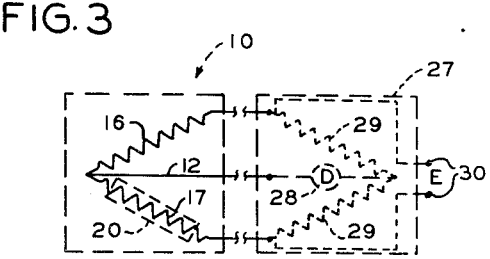
FIG. 4
INVENTOR.
PAUL BECKMAN
BY Jacob Tracktman
ATTORNEY

United States Patent Office 2,948,872
Patented Aug. 9, 1960

2,948,872

SENSING MEANS

Paul Beckman, 1037 Tremont Drive, Glenolden, Pa.

Filed May 18, 1959, Ser. No. 813,832

8 Claims. (Cl. 338—3)

This invention relates to sensing means and, more particularly, to means especially suited for measuring strains in bodies subjected to stresses and temperatures at high temperatures.

Strain gauges of the wire resistance type have been used for measuring strains. However, it has been found that presently available gauges of this type are not completely satisfactory for the measurement of static, dynamic, changing strains at high temperatures, such as over 1000° F., which range is of vital interest in the development of aircraft and missiles. It is therefore an object of the present invention to provide a variable resistance type of strain gauge for the measurement of strains at high temperatures that is of basically simple construction, extremely sensitive, and which will measure static or dynamic strains at such high temperatures.

Another object of the present invention is to provide a high temperature strain gauge having two active elements, both of which respond to changes in temperature, and one of which additionally responds to changes in strain of the object being tested, whereby the difference between the response of both elements is indicative of the change in strain of the object being tested.

Still another object of the present is to provide a high temperature variable resistance strain gauge having two resistance elements which form two adjacent arms of a Wheatstone bridge, one such arm of the bridge being arranged to respond to changes in both temperature and strain of the object being tested, while the other such arm is arranged to respond only to changes in temperature of the object being tested, whereby the unbalance between the two arms of the bridge is indicative of the change in strain of the test object.

Another specific object of the present invention is to provide a high temperature strain gauge of the type described in which the two resistance elements of the two arms of the Wheatstone bridge are of substantially identical construction, have substantially identical thermal histories and mounted upon the test object at substantially identical locations.

In accomplishing the foregoing objects of the present invention, a variable resistance type strain gauge is provided with two resistance elements that may be used to form two adjacent arms of a Wheatstone bridge, one of the arms being subjected to changes in both the strain and temperature of the object being tested, while the other such arm is subjected only to changes in the temperature of such object, by placing the wire forming the second arm within a small insulating tube and leaving sufficient slack in this wire to prevent strain from being transmitted from the object under test to this arm of the bridge. However, as both wires forming the two arms of the Wheatstone bridge are secured in close proximity with each other to the object under test, both such arms are subjected to the same changes in temperature as the object under test, whereby the unbalance in the bridge is indicative of the changes in strain in the object under test.

All of the foregoing and still further objects and advantages of this invention will become apparent from a study of the following specification, taken in conjunction with the accompanying drawing, wherein:

Figure 1 is a plan view of a strain gauge made in accordance with one form of the present invention;

Figure 2 is an enlarged transverse cross sectional view taken along line 2—2 of Figure 1, showing, the manner in which certain elements are connected together;

Figure 3 is a fragmentary longitudinal cross sectional view taken along line 3—3 of Figure 1, showing the construction of certain parts of the gauge;

Figure 4 is a schematic circuit diagram of a strain gauge made in accordance with the present invention in operative use;

Figure 5 is a side elevational view, partly in section, of a modified form of construction;

Figure 6 is a view similar to Figure 1, showing still another embodiment of the present invention; and Figure 7 is a view similar to Figure 1, illustrating still another embodiment of the present invention.

Referring now more in detail to the drawing, and more particularly to Figures 1 to 4 thereof, a strain gauge 10 made in accordance with one form of the present invention is shown to include a common conductor or center tap in the form of a hollow tube 12 and a pair of similar, but shorter, auxiliary conductor tubes 13, 14. A pair of resistance wires 16, 17, are connected at one end to one end of the common conductor tube 12 and at their opposite ends to one of each of the auxiliary conductor tubes 13, 14, respectively. Both resistance wires 16, 17 are preferably cut from the same length of wire so as to have completely identical histories, eliminating any chance of error or inaccuracy that might otherwise be introduced because of any difference in such history.

As is more clearly shown in Figures 2 and 3 of the drawing, the ends of the resistance wires 16, 17 are swaged into the ends of the various conductor tubes 12, 13, 14. In addition, the outermost free ends of each of the conductor tubes 12, 13, 14 may be formed into flat contact terminals 22, 23, 24, respectively, which facilitates the connection of the leads to the associated test equipment. One of the resistance wires 17 is enclosed within an insulated tube 20 having a longitudinal bore 21, such tube preferably having a very thin wall and being constructed from a material of high purity, such as silica. For example, a silica tube of approximately .005 inch diameter with a wall thickness of .0005 inch has been found to be sufficiently flexible to conform to the shape of the object being tested, while allowing a resistance element 17 of .0005 inch diameter to be provided with sufficient slack therewithin to relieve it of any tension or compression due to changes in the strain of the object under test.

In actual use, the gauge 10 may be applied directly to an insulated surface of the object under test, such as by cement, with both resistance elements 16, 17 immediately adjacent to each other to detect substantially identical changes in temperature of the object under test. Since one resistance element 17 is contained within the shield tube 20 with sufficient slack to relieve it from any strains imposed by the expansion or contraction of the test object, such resistance element 17 will be responsive only to changes in the temperature of the test object. However, the other resistance element 16 cemented in stress and heat transmitting relationship with the object under test so as to be strained by changes in strain of the object. Thus, this resistance element 16 is responsive to changes in both temperature and strain of the object under test, such that the resulting unbalance in the Wheatstone bridge is indicative of the actual change in strain in the test object, all other variations in the resistance of the elements 16, 17 due to changes in temperature balancing each other out. As this eliminates any effects of the temperature coefficient of resistance, both resistance elements may be identically constructed of either pure metals or alloys thereof.

With reference now to Figure 6 of the drawing, it will be noted the resistance elements 16, 17 form two adjacent arms of the Wheatstone bridge measurement apparatus 27 having two arms 29 of identical resistance values, whereby a detector 28, to which the center tap 12 is connected is responsive to any unbalance in the bridge, when the bridge is connected to any suitable source of electrical energy, in a well known manner.

In Figure 5 of the drawing, a slightly modified form of construction 35 is shown wherein the gauge includes elements substantially identical to those hereinbefore described in connection with the gauge illustrated in Figure 1, the corresponding parts thereof being indicated by primed corresponding reference numerals. In this embodiment, however, the common conductor 12', the strain and temperature responsive resistance elements 16', the temperature responsive resistance elements 17', and the shield tube 20', are completely encased within a coating 36 of cement, to provide a more convenient package for application to an object under test. Whereas the gauge 10 illustrated in Figure 1 must be more carefully placed upon the object under test, to prevent crossing of wires, proper spacing, and the like, this modified form of construction 35 may be cemented directly to the object under test with a minimum amount of handling.

With reference now to Figure 6 of the drawing, still another embodiment 40 of the present invention is shown to include a common conductor tube 42, and a pair of auxiliary conductor tubes 43, 44, swaged at the outermost end to provide contact portions 52, 53, 54, respectively. A center tap 46 in the form of a flexible conductor wire is swaged at one end to the adjacent end of the central conductor tube 42, such center wire 46 replacing the less flexible center conductor tubes 12, 12' of the embodiments illustrated in Figures 1 and 5. A pair of resistance wires 47, 48 are each secured at one end to the adjacent ends of the conductor tubes 43, 44, and are connected at their opposite ends to the free end of the center wire 46, by any suitable terminal means 49. One of the resistance wires 47 is responsive to changes in both temperature and strain of the object under test, while the other such resistance wire 48 is provided with sufficient slack within the longitudinal bore 51 of a silica tubular shield 50 to relieve it from any strain imposed by the expansion and contraction of the object under test. Thus, with the gauge 40 connected to suitable measurement apparatus, hereinbefore described, the net unbalance between the resistance wires 47, 48 becomes indicative of changes in strain imposed by the object under test.

Referring now to Figure 7 of the drawing, another embodiment 55 of the present invention is shown to include individual conductor tubes 57, 58, 59, each being provided at one end with swaged contact terminals 67, 68, 69, respectively. A neutral wire 61 is swaged at one end upon the opposite end of one of the conductor tubes 58, the opposite end of such neutral wire 61 being connected by any suitable terminal means 64 to the adjacent ends of a pair of resistance wires 62, 63, which are connected at their opposite ends to the other conductor tubes 57, 59, respectively. The resistance wire 63 within the tubular shield 65 is provided with sufficient slack to avoid reflecting any changes in the strain of the object under test, while the other such resistance wire 62 is in strain transmitting relationship therewith.

This embodiment 55 of the invention differs from the embodiment illustrated in Figure 6 of the drawing by the position of the tubular shield 65 which not only insulates the enclosed resistance wire 63 from the object under test, but also electrically insulates the neutral wire 61 from the other resistance wire 62, thus allowing all of the wires to be more closely spaced together and enabling the gauge to be attached to the object under test with less precision.

While each of the embodiments illustrated in Figures 6 and 7 of the drawing are intended to be applied in an uncoated state to the object under test, and cemented in place in any suitable manner, such gauges 40, 55, may also be encased within a cement layer, in the manner illustrated in Figure 5 of the drawing, to provide for greater ease of application and handling.

The present invention also contemplates the use of a tubular shield which may disintegrate or otherwise disappear after the gauge has been attached to the object under test and after subjecting the gauge to conditions such as heat, to cause the disintegration or dissolution thereof. Removing the tubular shield after the object has been placed under test will further improve the accuracy of the test results by removing any thermal insulating barrier from shielded engagement with the slack resistance wire. Thus, while the cement enclosing the gauge remains intact so as to form a tubular passageway around the originally shielded resistance wire, the disintegration of the original tubular shield will subject the slack wire to substantially identical temperature conditions as those experienced by the strain responsive resistance wire.

Because of the compactness of the gauge made in accordance with the present invention, the resistance wires are applied to a relatively small area, providing much more accurate results than would be possible using a second gauge for calibration purposes. In addition, as all three contact conductors of each gauge are aligned within a substantially single plane, the proper surface contact between the gauge parts and the surface of the object under test is mutually assured. The predetermined position of each of these parts also enables each element to be readily identified for connecting them to the proper test apparatus.

While this invention has been described with particular reference to the construction shown in the drawing, it is to be understood that such is not to be construed as imparting limitations upon the invention, which is best defined by the claims appended hereto.

What is claimed is:

1. A temperature compensated electrical strain gage comprising, in combination, an elongated shield of electrical insulation, a temperature compensating electrical resistance element extending through the opposite ends of the shield and disposed freely therein so that no strain can be transmitted through the shield to the temperature compensating element, a strain responsive electrical resistance element disposed lengthwise of and outside of said shield and connected at a junction point to one end of the temperature compensating element, leads connected respectively to said junction point and to the other ends of said resistance elements, and electrical insulation means for bonding the shield and the strain responsive element throughout its effective length to a member whose strain is to be measured, whereby the strain responsive element is subject to changes in electrical resistance in response to both strain and temperature and the temperature compensating element is subject to changes in electrical resistance in response only to temperature variations so that the two electrical elements when disposed in adjacent arms of a measuring bridge will cancel their changes in electrical resistances arising from temperature variations thereby allowing only the strain response to be measured.

2. The combination set forth in claim 1 further characterized in that the shield of electrical insulation is a tube in which the temperature compensating element is disposed.

3. The combination set forth in claim 1 further characterized in that the shield is a tube and the temperature compensating resistance element is disposed within the tube along an irregular path so as to be completely untaut.

4. A temperature compensated electrical strain gage comprising, in combination, a tube of electrical insulation, a temperature compensating electrical resistance element extending through the opposite ends of the tube and disposed freely therein so that no strain can be transmitted through the tube to the temperature compensating element, a strain responsive electrical resistance element disposed outside of said tube and connected at a junction point to one end of the temperature compensating element, leads connected respectively to said junction point and to the other ends of said resistance elements, and electrical insulation means for bonding together the tube and the strain responsive element throughout its effective length so as to form an integral gage unit which is adapted to be bonded to a member whose strain is to be measured, whereby the strain responsive element is subject to changes in electrical resistance in response to both strain and temperature and the temperature compensating element is subject to changes in electrical resistances in response only to temperature variations so that the two electrical elements when disposed in adjacent arms of a measuring bridge will cancel their changes in electrical resistances arising from temperature variations thereby allowing only the strain response to be measured.

5. The combination set forth in claim 4 further characterized in that the lead connected to the junction point extends for substantially the full length of the tube and of the strain responsive element, the resistance elements and tube being disposed substantially parallel to each other with their axes lying in a substantially common plane whereby the gage unit may be placed on a curved surface with said common plane conforming to the curvature of such surface.

6. A temperature compensated electrical strain gage comprising, in combination, a tube of electrical insulation, a temperature compensating electrical resistance element disposed freely therein so that changes in its electrical resistance arise solely from the temperature coefficient of electrical resistance of the material of which the element is made, a strain responsive electrical resistance element disposed lengthwise of and outside of said tube and connected at a junction point to one end of the temperature compensating element, conductor leads connected respectively to said junction point and to the other ends of said resistance elements so that the resistance elements may be placed in adjacent arms of a measuring bridge, an electrical insulation means for bonding the tube and the strain responsive element throughout its effective length to a member whose strain is to be measured, whereby the strain responsive element is subject to changes in electrical resistance in response to both strain and temperature and the temperature compensating element is subject to changes in electrical resistance arising solely from the temperature coefficient of resistance of the material of which the compensating element is made.

7. An electrical strain gage comprising, in combination, an elongated electrical conductor lead, electrical resistance elements of substantially the same strain sensitivity characteristics extending along the opposite sides of the conductor lead from one end thereof and substantially parallel thereto but laterally spaced therefrom said resistance elements being commonly connected to said end of the conductor and terminating in outer ends, means for encasing the resistance elements and conductor lead within the interior of an insulation bonding material so as to form an integral gage unit which is adapted to be bonded to a member whose strain is to be measured, and other conductor leads connected respectively to the outer ends of said resistance elements, whereby the three conductor leads allow the two electrical resistance elements to be connected in adjacent arms of a measuring bridge.

8. The combination set forth in claim 6 further characterized in that the first conductor lead is a metallic tube and the resistance elements lie on opposite sides thereof in a common plane containing substantially the tube axis.

References Cited in the file of this patent

UNITED STATES PATENTS

| | | |
|---|---|---|
| 2,322,319 | Ruge | June 22, 1943 |
| 2,344,648 | Simmons | Mar. 21, 1944 |
| 2,421,907 | Postlewaite | June 10, 1947 |
| 2,474,146 | Hathaway | June 21, 1949 |
| 2,569,714 | Gregory | Oct. 2, 1951 |
| 2,892,993 | Kiernan | June 30, 1959 |